March 4, 1924.   1,485,825

W. H. BEALE

ANTISKID DEVICE FOR AUTOMOBILES

Filed March 13, 1923

Inventor
Wellington H. Beale
by Oring & Hague, Att'ys.

Patented Mar. 4, 1924.

1,485,825

UNITED STATES PATENT OFFICE.

WELLINGTON H. BEALE, OF MARSHALLTOWN, IOWA.

ANTISKID DEVICE FOR AUTOMOBILES.

Application filed March 13, 1923. Serial No. 624,730.

*To all whom it may concern:*

Be it known that I, WELLINGTON H. BEALE, a citizen of the United States, and a resident of Marshalltown, in the county of Marshall, State of Iowa, have invented a certain new and useful Antiskid Device for Automobiles, of which the following is a specification.

The object of my invention is to provide an antiskid device of simple, durable and inexpensive construction which may be easily and quickly applied to the chassis of an automobile, and when so applied, may be easily and quickly put into operation in such a manner that the automobile may be operated without skidding over slippery roads or streets.

More specifically it is the object of my invention to provide an anti-skid device for automobiles constructed in units which may be easily and quickly applied, and provided with a comparatively sharp blade or roller which may be elevated and lowered from or to the ground surface, and when lowered, will be yieldingly held in contact with the ground surface, and so arranged that it will be capable of yielding in either direction, so that in case it should engage obstacles such as stones or the like, the antiskid device or the frame on which it is mounted will not become broken.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of an automobile with a portion of the body broken away to show the manner in which my improved device is applied.

Figure 2 is a plan view of the chassis showing my improved device applied thereto.

Figure 3 is a detail plan view of one of the anti-skid units.

Figure 4 is a side elevation of the same with a portion of the frame broken away.

Figure 5 is an enlarged, detail view of one form of the surface engaging blade.

Figure 6 is a detail elevation of the crank and ratchet device for elevating and lowering the anti-skid device; and Figure 7 is a side elevation of a modified form of the surface engaging member which comprises a roller or disk.

The numeral 10 indicates the body of an automobile, 11 the wheels and 12 the frame. The said frame is provided with a front axle 13 and a rear axle 14, both of said axles being carried by the wheels 11.

My improved anti-skid device comprises a pair of frame members, each of which consists of a bar 15 running longitudinally with the frame member 12, having their front ends detachably secured with the front axle 13 by means of suitable bolts 16. These members 15 are arranged preferably above the axles 13 and 14 and slightly inside of the frame member 12.

The rear end of each of the members 15 is provided with a circular frame member 17 formed preferably of strap iron. The ends of the circular member 17 are designed to rest adjacent to the side faces of the back ends of the members 15, and secured thereto by means of rivets 18, as clearly shown in Figures 2 and 3.

The lower edge of the circular frame 17 is designed to rest on top of the rear axle 14 with its center slightly ahead of said axle. The frame 17 is provided with outwardly extending brackets 20, which are designed to receive bolts 21 for detachably securing the frame to the axle 14.

The axle 14 is provided with bracket members 22 which are formed in two pieces in the form of semi-circular members having flanges 23, which are secured together by means of bolts 24. These semi-circular pieces form a clamp for supporting the bracket member 22, which is secured to the forward one of the said semi-circular members. The member 22 is arranged in a horizontal position and provided with a vertical opening 25. The opening 25 is located centrally and slightly below the lower edge of the frame 17

The opening 25 is designed to receive a loosely mounted and vertically arranged shaft 26, the upper end of which is provided with an eye 27 and four radially arranged ears 29, and the lower end provided with a slot 28, said ears being spaced an equal distance apart, one set in a longitudinal line of the automobile, while the other set is arranged transversely.

Each of the ears 29 is provided with a contractile coil spring 30. The opposite end of each of the springs 30 is connected to the frame 27 by means of bolts 31. Each of the bolts 31 is provided with a nut 32 so that the tension on the springs 30 may be varied if desired.

The members 29 are located above the bracket 22 in such a manner that when the shaft 26 is moved to an elevated position, by mechanism hereinafter to be described, the springs 30 will assume a downwardly and outwardly inclined position and have a tendency to move the bar 26 downwardly and toward maintaining the shaft 26 in a vertical position.

The lower end of the shaft 26 is provided with an anti-skid member 33. My preferred form of this anti-skid device comprises substantially a blade having an upwardly extending portion 34 designed to enter the slot 28 and to be detachably secured therein by means of bolts 35. The lower edge of the said blade is tapered and brought to a sharp point with the body portion of the blade longitudinal with the body of the car, and its front and rear edges curved inwardly, said curved portions intersecting vertically beneath the lower end of the shaft 26.

The operation of this part of my device is as follows:

Assuming that the rod 26 is moved to its lowered position as shown in Figure 4, and the lower edge of the member 33 in engagement with the ground surface, indicated by the horizontal line 37, it will be seen that as the automobile is advanced, it will be held against skidding sideways due to the fact that the lower edge of the blade 33 will cut slightly into the ground surface. If the blade 33 should engage an obstacle, such as a rock, it may be moved rearwardly against the action of the rear spring 30 and quickly returned to normal position after disengaging the same.

It will also be seen that if the blade 33 should engage one side of an obstacle, and that the automobile would suddenly be thrown sideways, one of the side springs 30 would yield and prevent the blade from becoming broken, which has a tendency to absorb any sudden shocks caused by a side movement of the automobile. The forwardly extending spring 30 prevents the blade from being moved forwardly when the automobile is backed. All of the springs 30 have a tendency to yieldably hold the blade against the ground surface. The frame members 15 are provided to retain the circular frame against rotary movement about the rear axle casing, and thereby eliminate any danger of the rear axle being twisted off or broken.

In Figure 7 I have shown a modified form of a surface engaging member which comprises a yoke 38 having an upwardly extending member 39 to enter the slot 28 of the shaft 26. The yoke 38 is designed to receive a disk 40 which is pivotally mounted therein by the rivet 41. Either of the members 33 or 38 may be used at the will of the operator.

For raising and lowering the shaft 26, I have provided a cable 42 which is designed to pass through suitable pulleys 43 secured to the automobile frame 12. Both of the cables 42 are spliced to a single cable 44 at the point 45. The cable 44 is carried over a pulley 46, and thence to a winding drum 47 located in front of the scowl board 48. The drum 47 is provided with a shaft 49 in which is mounted a ratchet 50. The outer end of the shaft 49 is provided with a crank 51 by means of which the drum 47 may be rotated in one direction to simultaneously elevate the shafts 26, and in the opposite direction to lower them.

The shafts 26 are held in an elevated position by means of a pawl 52 engaging the teeth of the ratchet 50. The pawl 52 is provided with a handle 53 by which the said pawl may be released whenever it is desired to place the members 33 into an operative position.

By this arrangement it will be seen that if the operator's car starts skidding, he simply throws the pawl 52 out of engagement with the ratchet 50. The springs 30 will then immediately throw the shaft 26 downwardly, and the members 33 into engagement with the surface of the ground, after which the shaft 26 is free to either slide up or down through the opening 25, or to have its lower end swung in a universal direction against the action of the springs 30, the bracket 22 acting as a fulcrum.

It will, therefore, be seen that I have provided an anti-skid device of simple, durable and inexpensive construction, which may be easily and quickly applied to the frame of an automobile, and when applied, will efficiently and positively prevent the automobile from skidding, and which may be easily and quickly actuated when desired.

It will be seen that slight changes might be made in the construction of my device without departing from the spirit of the invention.

I claim as my invention:

1. An anti-skid device comprising a frame member, means for detachably securing the same to the axle of an automobile, a bracket located centrally with said frame having a vertically arranged opening, a vertically arranged shaft loosely and slidably mounted therein, a surface engaging member on the lower end of said shaft, means attached to the upper end of said shaft for elevating and lowering the same, means for yieldably holding the shaft to its lower limit of movement and yieldably retaining the said lower end against lateral movement in either direction, and means for actuating said elevating and lowering means.

2. An anti-skid device comprising a horizontally arranged frame member having at one end a circular frame member, means for detachably securing the circular frame member to the axle of an automobile, a bracket located centrally within said circular frame having a vertically arranged opening, a vertically arranged shaft loosely and slidably mounted within said opening, a detachable surface engaging member on the lower end of said shaft, a series of contractile coil springs having one of their ends secured to said frame and arranged in a radial and inclined manner with said shaft, the opposite ends of said springs being secured to said shaft to yieldably move the shaft downwardly and to yieldably hold the lower end against lateral movement, means for elevating said shaft against the action of said springs, and means for retaining the shaft in an elevated position.

3. In combination, the chassis of an automobile including front and rear axles, a pair of frame members parallel with the longitudinal frame members of said chassis, said frame members having their ends detachably secured to the front axle, and their rear ends provided with a loop arranged in a horizontal plane and detachably secured to said rear axle, a supporting bracket located centrally within each of said loops, a vertically arranged shaft slidably and loosely mounted in said central bracket, a surface engaging member on the lower end of said shaft, means for yieldably holding the shaft downwardly, means for yieldably holding the lower end of said shaft against lateral movement, a pair of cables attached to the upper ends of said vertically arranged shafts designed to pass over suitable pulleys on the frame of said chassis, a second cable designed to operate simultaneously with the first said cables, a pulley for said second cable, a drum for said second cable, a ratchet device for said drum, a crank for said ratchet, and said drum, and a pawl for said ratchet, substantially as described and for the purposes stated.

4. In combination, the chassis of an automobile, a frame detachably connected therewith, means carried by said detachable frame capable of being elevated and lowered and designed to carry a surface engaging member, means carried by said frame for yieldably retaining the surface engaging member against lateral movement in either direction, means for yieldably holding the surface engaging member against the ground surface, means for moving said surface engaging means out of engagement with the ground surface, and means for locking the last said means in its elevated position.

Des Moines, Iowa, February 28, 1923.

WELLINGTON H. BEALE.